Nov. 1, 1960 I. ONO 2,958,620

PLASTIC ELASTIC PRODUCTS OF PIECE-GOODS

Filed Sept. 26, 1956

IWAO ONO,
INVENTOR

BY Hall & Houghton

ATTORNEY

United States Patent Office 2,958,620
Patented Nov. 1, 1960

2,958,620

PLASTIC ELASTIC PRODUCTS OF PIECE-GOODS

Iwao Ono, 68 Ashirokita 1-chome, Fuse City, Japan

Filed Sept. 26, 1956, Ser. No. 612,280

8 Claims. (Cl. 154—106)

This invention relates to plastic elastic products of piece-goods having a number of air chambers and particularly to improvements in such goods as described and claimed in my pending application Serial No. 458,096, filed Sept. 24, 1954 (Patent No. 2,772,193, issued Nov. 27, 1956).

In said application I have disclosed a plastic modified net consisting of a plurality of plastic tubes arranged closely in parallel to each other, each of said tubes being flattened and welded at spaces to divide it into air chambers, and each tube being connected to the adjacent one by said welding.

The present invention relates to improvements or modification of such goods and it is the feature of the invention that a sheet, plate, board or the like which is hereinafter called lining member, made of a plastic material same as or similar to that of the tubes is attached on one side of such net at the tube welded portions in such a manner that there is formed clearance between the air chambers and the lining member. Furthermore, my invention contemplates insertion or embedment of threads in the welded portion for reinforcement and ornamental purposes.

The object of the present invention is to provide plastic elastic products of piece-goods having the features of neutralizing the shock of concussion and pretty appearance and which are reinforced and are prevented from leakage of fluids.

Other objects, features and advantages of this invention will be readily apparent from the following description made in connection with the accompanying drawings.

Figure 1:
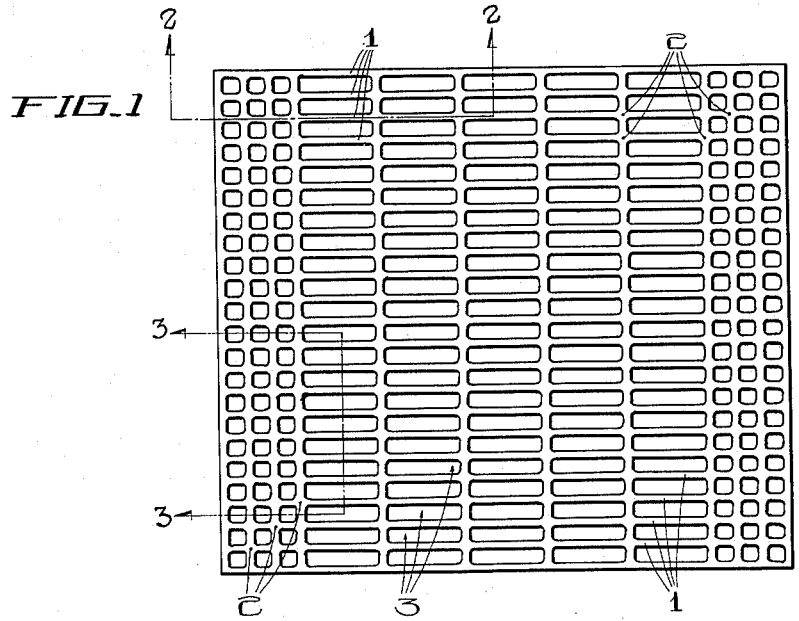
Figure 1 is a plan view of plastic piece-goods embodying my invention.
Figure 2:
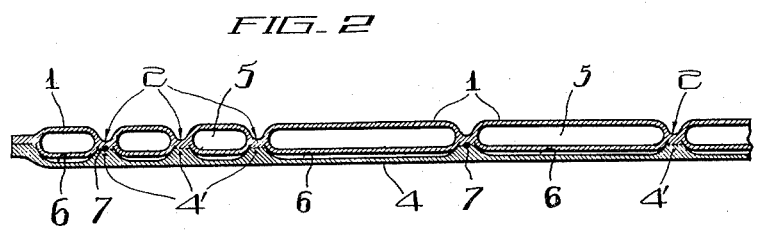
Figure 2 is a sectional view taken along the line 2—2 of Figure 1.
Figure 3:
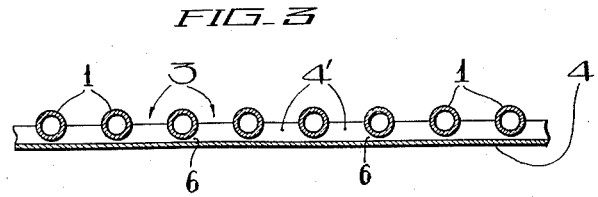
Figure 3 is a sectional view taken along the line 3—3 of Figure 1.

As shown in the drawings, the piece-goods comprise a plurality of flexible plastic tubes 1 arranged closely in parallel to each other. Each of said tubes is flattened and welded at 2 by applying heat and pressure by any known means at desired spaces so that the tube 1 is divided into air chambers 5. The welded portions 2 are enlarged to the lateral directions and form solid portions, thereby the tubes are weld-connected with each other as shown. If desired, connecting strips of the same material with that of the tubes 1 may be placed upon the portions of the tubes to be welded, and welded together with the tubes so as to connect the tubes more firmly. Gaps 3 are formed between the adjacent tubes, which permit air, water or the like to flow through them. It should be understood that the welding may be in straight lines, combined straight lines, curved lines or any suitable designs. It is also possible to arrange the tubes at difference spaces. Furthermore, the tubes may be arranged so as to cross each other. In this case, the crossing points may be welded with each other. And a tube 1 may be furled into a swirl to weld radially. It is also possible to insert threads or yarns in the tubes beforehand so that the yarns or threads are buried in the solid portions 2 when the tubes are welded. These yarns or threads may be used for ornamental purposes as well as controlling the elasticity of the net structure. These features have been clearly described in my above identified copending application.

According to the present invention a sheet, plate, board or the like made of a plastic material similar to or same as that of the tubes 1. The lining member is indicated with the reference numeral 4 in the drawings. The lining member 4 is welded at 4' together with the welded portions 2 at one side thereof in such a manner that there are formed clearances 6 between the air chambers 5 and the lining member 4.

The advantages of the new construction according to the invention are, among others, as follows:

(1) The net structure is backed up by the lining member 4 and is, therefore, reinforced thereby.

(2) When the piece-goods are placed on a flat base such as table, with the lining member 4 in contact with the face of the base, they are steadily supported through said lining member and a slip on the base is prevented by the frictional engagement of the lining member with the base surface.

(3) In the above case, even when fluid such as water is spilt on the face of the net structure it flows down and is held by the lining member 4 and within the clearances 6, so that leakage of fluid is prevented and the fluid so held in the clearances will not rush out or overflow even when the piece-goods are swung or shaked.

(4) When the piece-goods are placed with the lining member facing outside, an irregularly shaped substance may be stably put on the face of the lining member as the air chambers are distributed below and all over said member. The lining member neutralizes the shock of concussion and is comfortable in touch. One can smoothly and comfortably write on the face of the lining member.

(5) The piece-goods have various other uses such as matting, packing, table cover or the like.

It is preferable to insert or embed threads or yarns 7 in the solid or welded portions 2 along the lines of the welding so as to reinforce the welded portions 2. The threads or yarns 7 may be ornamental when the plastic material used is transparent. It is also possible to control the elasticity of the piece-goods by suitably selecting the strength and elasticity of such yarns or threads.

The yarns or threads 7 may be buried or inserted in the solid portions 2 by any means. For example, the threads 7 are inserted in connecting strips of the same material with that of tubes 1, which strips are placed upon the portions of the tubes to be welded. Then, the strips, tubes and lining member are welded together so that the threads 7 are embedded in the welded or solid portions 2. Instead of the connecting strips, connecting tubes in which are inserted threads may be used.

I claim:

1. A method of forming an internally compartmented flexible plastic structure that comprises arranging a row of flexible thermo-plastic tubes in spaced parallel relation to each other and internally compartmenting said tubes and simultaneously interconnecting the same to form a net by flattening and welding together only at spaced regions intermediate the lengths of the tubes by the application of heat and pressure to said spaced regions leaving the tubes separated from each other between said spaced regions, and further characterized in that there is placed against the said arrangement of tubes a flat continuous lining sheet of flexible thermo-plastic material, and in that said flat sheet is secured to said net-structures by welding the same to at least some of said spaced apart welded portions of said net structure by the application of heat and pressure to said spaced regions, leaving the tubes separate from said lining sheet between said spaced regions.

2. A method of forming an internally compartmented flexible plastic structure that comprises arranging a row of flexible thermo-plastic tubes in spaced parallel relation to each other and internally compartmenting said tubes and simultaneously interconnecting the same to form a net by flattening and welding together only at spaced regions intermediate the lengths of the tubes by the application of heat and pressure to said spaced regions leaving the tubes separated from each other between said spaced regions, and further characterized in that there is placed against the said arrangement of tubes a thermoplastic member having a thread confined thereby, and in that said member is secured to said net structure by welding the same to at least some of the spaced apart welded portions of said net structure with said thread embedded in the welds thereat by the application of heat and pressure to the said spaced portion of the assembly.

3. A method according to claim 2, in which the thermoplastic member is a strip of the same thermo-plastic material as that of which the tubes are formed, in which the thread is embedded.

4. A method according to claim 2, in which the thermoplastic member is itself a tube of thermoplastic material, in which said thread is inserted, and extends transversely of said first named row of tubes.

5. A method of forming an internally compartmented flexible plastic structure that comprises arranging a row of flexible thermoplastic tubes in spaced parallel relation to each other on a lining sheet of flexible thermo-plastic material, and internally compartmenting said tubes and simultaneously interconnecting the same with each other and with said lining sheet to form a net integral with and backed by said lining sheet by flattening and welding together and to said backing sheet only spaced regions intermediate the lengths of said tubes by the application of heat and pressure thereto, leaving the tubes separated from each other and from said backing sheet between such spaced regions.

6. An internally compartmented flexible plastic structure comprising a row of flexible thermoplastic tubes arranged in spaced parallel relation to each other and having a number of spaced regions thereof flattened and merged internally intermediate their ends, the tubes of said row being interconnected at said flattened portions only, said structure further comprising a continuous lining sheet attached to one side of the row of tubes at said spaced flattened portions only, the tubes between said flattened portions being separated from each other and from said lining sheet.

7. An internally compartmented flexible plastic structure according to claim 5, further comprising yarn embedded in the flattened portions of the structure.

8. An internally compartmented flexible plastic structure comprising a thermoplastic lining sheet, a row of mutually spaced thermoplastic tubes superimposed thereon, spaced regions of said tubes intermediate their sides being flattened and merged internally dividing said tubes into compartments, and said flattened portions only being merged with said lining sheet, the portions of said tubes between said flattened portions being separated from each other and from said lining sheet.

References Cited in the file of this patent
UNITED STATES PATENTS

| | | |
|---|---|---|
| 490,556 | Gerhard | Jan. 24, 1893 |
| 889,756 | Bukacek | June 2, 1908 |
| 2,030,746 | Galligan et al. | Feb. 11, 1936 |
| 2,100,492 | Sindler | Nov. 30, 1937 |
| 2,189,813 | McGuire | Feb. 13, 1940 |
| 2,397,743 | Kaphan | Apr. 2, 1946 |
| 2,633,442 | Caldwell | Mar. 31, 1953 |
| 2,772,193 | Ono | Nov. 27, 1956 |
| 2,777,789 | Smith | Jan. 15, 1957 |